United States Patent
Hobson

(10) Patent No.: US 9,073,690 B1
(45) Date of Patent: Jul. 7, 2015

(54) APPARATUS AND METHOD FOR TREATING DUMP TRUCK BEDS

(71) Applicant: Horace Hobson, Jacksonville, AR (US)

(72) Inventor: Horace Hobson, Jacksonville, AR (US)

( * ) Notice: Subject to any disclaimer, the term of this patent is extended or adjusted under 35 U.S.C. 154(b) by 0 days.

(21) Appl. No.: 13/961,703

(22) Filed: Aug. 7, 2013

(51) Int. Cl.
  *B62D 33/00* (2006.01)
  *B65F 3/00* (2006.01)

(52) U.S. Cl.
  CPC .......................................... *B65F 3/00* (2013.01)

(58) Field of Classification Search
  CPC ....................................................... B60P 1/286
  USPC ........................... 134/123; 239/657; 427/427.3
  See application file for complete search history.

(56) References Cited

U.S. PATENT DOCUMENTS

| | | | |
|---|---|---|---|
| 6,338,521 B1 * | 1/2002 | Henning | 296/100.15 |
| 7,481,483 B2 * | 1/2009 | D'Amico et al. | 296/183.1 |
| 2006/0124154 A1 * | 6/2006 | Rivalto | 134/18 |
| 2007/0186956 A1 * | 8/2007 | Schlueter | 134/8 |
| 2008/0110476 A1 * | 5/2008 | Amestoy et al. | 134/34 |

\* cited by examiner

*Primary Examiner* — Nathan T Leong
(74) *Attorney, Agent, or Firm* — Wyatt, Tarrant & Combs, LLP; William S. Parks

(57) ABSTRACT

An integrated spray-treating system within the bed of a dump truck to allow for complete internal coverage of such a bed as well as that of a movable cover present thereon is provided. Such a system includes at least rotatable spray nozzle device that permits spray coverage of the entirety of the bed as well as the cover. Additionally, the system comprises a pressure component incorporated with a standard hydraulic component of such a truck as well as a suitable controller configured for the driver to operate the system from within the chassis. The system may be provided as an add-on to an already-existing truck or included within a typical truck manufacturing process. The overall operation thus permits the driver/operator the capability of coating the bed surface to prevent undesirable asphalt or other material build-up, caking, and the like, therein.

8 Claims, 3 Drawing Sheets

APPARATUS AND METHOD FOR TREATING DUMP TRUCK BEDS

FIELD OF THE INVENTION

The present invention relates to an integrated spray-treating system within the bed of a dump truck to allow for complete internal coverage of such a bed as well as that of a movable cover present thereon. Such a system includes at least rotatable spray nozzle device that permits spray coverage of the entirety of the bed as well as the cover. Additionally, the system comprises a pressure component incorporated with a standard hydraulic component of such a truck as well as a suitable controller configured for the driver to operate the system from within the chassis. The system may be provided as an add-on to an already-existing truck or included within a typical truck manufacturing process. The overall operation thus permits the driver the capability of coating the bed surface to prevent undesirable asphalt or other material build-up, caking, and the like, therein.

BACKGROUND OF THE INVENTION

Road paving has been standard for over one-hundred years in order to accommodate automotive transportation requirements. Such paving procedures include earth movement and leveling, asphalt and bitumen introduction, asphalt leveling, and other steps. In essence, such a process requires the delivery of asphalt and like materials to specific road paving locations. Such materials are provided in proper form, namely as loose, but adhesive structures that can be placed at a specific location on a road paving site that can be spread and pressed into a finished continuous road.

Since road paving generally entails remote locations and continuous structures of significant lengths, such asphalt materials must be produced at a separate site and suitably transported as necessary. As such, contractors (and sub-contractors, as the case may be) must effectively estimate the amount of asphalt that is needed for pre-determined paving procedures in order to not only provide suitable amounts for proper coverage, but also to remain with a specific budget for the overall contract. Delivery trucks, such as dump trucks (referring to the capability of such a vehicle to have placed within its bed, haul, and then remove materials through raising its bed), are typically utilized for such asphalt transportation needs. The proper delivery, however, of these sticky materials, particularly as it pertains to the compacted nature thereof during transport, creates certain problems that have proven rather troublesome within this industry. For instance, the sheer weight of such asphalt materials, coupled with their necessarily elevated temperatures (to guarantee a certain degree of viscosity upon arrival at the paving location), causes, generally speaking, consequences of certain portions, particularly within the lower regions of the transported samples, to not only adhere together compactly, but also to stick to the target truck bed. More particularly, such asphalt adhesion occurs more readily in the "dog house" portion of the truck bed, most likely due to the hotter temperatures generated by the vehicle at that location, as well as the greater denseness of the materials themselves at that specific area of the bed. In any event, asphalt adhesion is noticeably more prominent and likely at such a location than other places in the target dump truck bed. This result has proven to cause significant problems for drivers and pavers alike. Such asphalt clusters may agglomerate to a great extent as to prevent, at least, an evenly flowing asphalt sample to move from the truck bed to the paving site. Any retained asphalt within the truck will thus either not be properly transported to the paving location (thus skewing the estimated asphalt amounts needed for the project) or will require removal in a forceful manner at the site. Such removed, clustered asphalt materials, however, are not of a suitable flow for introduction within the paving methods and/or the paving machinery. If the delivered asphalt is not of the proper consistency, the leveler, mixer, etc., may be compromised and damage to such machinery may readily occur. Additionally, retained asphalt residues could accumulate in the corners of a truck bed and effect the distribution to such an extent that an extended bed during a dumping operation could actually cause the truck to flip over.

Even if such clusters of asphalt are not removed at the paving site, the driver/operator must, at some point, act accordingly to remove such undesirable compacted materials to ensure proper weight distribution in his or her truck, proper weighing for future delivery jobs is permitted, and/or desired cleanliness of the truck is undertaken for other reasons. As well, fuel efficiency may be compromised when the bed is "empty" as a significant amount of residual asphalt may accumulate thereby increasing the overall weight of the truck. In any event, the removal of such agglomerated asphalt materials is not an easy task. If such materials do, in fact, impact the weight distribution of the vehicle, as one example, the driver/operator will need to stop his or her truck and properly tend to such a problem. If the problem occurs on a busy highway or road, such removal will be quite important to ensure the vehicle is properly controlled for safe driving. Necessarily cleaning the bed along a highway or road may jeopardize the safety of the driver/operator, not to mention the resultant clustered asphalt would require placement outside the truck bed. If such placement is made along a road or highway shoulder, it would be evident that such a resultant large, heavy, dense sample could create a further safety hazard at that location, as well.

Likewise, as alluded to above, such trucks typically include covers that are automated in such a fashion as to maneuver over the transported asphalt material sample within a target dump truck bed in order to prevent any appreciable amounts of asphalt from escaping the truck bed during transport. Without such a cover, the loose top level asphalt could become dislodged, etc., from the material sample and be inadvertently removed during such an activity prior to the needed delivery at the paving location. Such a cover, though, is typically made from a material that easily adheres to heated asphalt (and other live paving materials) such that upon removal from the asphalt sample, either the cover may become damaged (torn, etc.) or significant amounts of asphalt may be retained adhered to the cover, itself. In either case, the driver/operator would be out some asphalt as it remains on the cover, and/or the cover itself would require some degree of reconstruction to ensure future utilization will not be compromised.

As it is, basically, there exists a significant problem within the asphalt delivery industry due to the aforementioned issues. The lack of a straightforward and simple system to remedy these potential deficiencies provides the asphalt industry with difficulties in properly estimating amounts of asphalt that will actually be delivered properly and/or delivered in proper form, as well as potential damage to target truck beds, if not possibly injuries to drivers/operators in order to effectively remove such adhesive asphalt materials on demand.

It is evident that there exists a need to provide an effective manner of best ensuring proper delivery of properly estimated (and thus, expected) amounts of such materials to authorized paving locations. As well, there also exists a need to reduce any propensity of such important, but also potentially damaging, asphalt materials to compromise either truck safety or driver/operator safety. In the past, methods have included providing high-pressure cleaning subsequent to asphalt delivery (and at a location different from the paving site) in order to safely clean any clustered asphalt materials therefrom. Additionally, asphalt release agents have been developed to allow for easier removal of such materials, although the utilization of such agents have been limited to spray methods that are external of the truck itself. Otherwise, the utilization of hard-structure implements (shovels, picks, etc.) to clean such adhesive materials from truck beds have proven to be of great necessity to ensure the noted cleanliness/thorough delivery requests have been readily fulfilled (such implements may break up compacted materials such that introduction into a paving procedure may be accomplished at least more reliably than for a clustered sample). However, this option is fraught with potential problems, as well, particularly the need for the driver/operator to undertake significant physical exertion to complete such a task (and the potential for such a person to injure himself or herself either during such an activity or in the effort to actually maneuver himself or herself to the proper location within the truck bed). Likewise, the hard implements may also damage the truck bed to a degree that is quite undesirable, too.

Thus, there remains a significant problem that has yet to be properly addressed within the asphalt (and other like materials) delivery and transport industry. To date, the only remedies made available have focused on post-delivery activities as well as highly physical procedures that may or may not provide effective asphalt (or other material) removal for proper utilization within a paving process. The present invention thus overcomes each of these noted deficiencies.

ADVANTAGES AND SUMMARY OF THE INVENTION

It is an advantage of the present invention to provide a reliable treatment to prevent asphalt accumulation in the bed of a dump truck through an truck-integrated device. It is an additional advantage that the inventive device provides coverage of the entirety of the subject truck bed as well as a movable cover. Yet another advantage of this invention is the ability to reliably deliver substantially all of a transported asphalt shipment to the desired paving location without the necessity of any appreciable actions beyond dumping such materials from the subject bed. Additionally, this invention provides the advantage that the driver/operator may activate the device to treat the entirety of the bed and movable cover on demand from the cab.

Accordingly, the present invention encompasses a dump truck including an integrated spray device therein disposed at a location adjacent the cab of said truck and aimed toward the bed thereof such that the spray generated thereby will solely enter said truck bed, wherein said device is further configured to rotate sufficiently to provide treatment of said spray over the entirety of said subject truck bed while rotating and spraying simultaneously. Furthermore, such an invention also encompasses the device described above that is configured to treat the underside of a movable cover also integrated within the subject truck that provides a manner of preventing egress of asphalt materials therefrom during transport. Also encompassed within this invention is the method of utilizing such a device to spray a suitable solvent that reduces adhesion of said asphalt materials to the surface of said truck bed and said movable cover during utilization thereof.

Such a device allows for an effective manner of reducing, if not totally preventing, accumulation of heated asphalt from such bed and cover surfaces without the need for a driver/operator (or other person) to undertake physical activity within the bed itself to dislodge or otherwise clean out the subject bed subsequent to actual transport and/or delivery of such materials. In essence, the spray device allows a driver/operator with the capability of controlled, integrated treatments of the subject surfaces prior to asphalt introduction to apply a suitable coating to reduce/prevent asphalt adhesion. As noted above, the potential for undesirable accumulation of asphalt within such a trick bed causes significant problems within the industry. Whether it pertain to the possibility of delivering skewed amounts in relation to budgeted materials estimates, to increasing the vehicle's weight after delivery has actually occurred, at least, the difficulties such adhesive qualities cause are quite problematic and necessitate improvements. The inventive device significantly reduces the propensity for asphalt caking, etc., in such a situation, while allowing for minimal driver/operator involvement to achieve such a desirable result.

The device itself thus includes at least one array of nozzles configured in a substantially straight line that itself is attached in an area along a truck bed wall adjacent to the cab and directed toward the internal portion of the bed. Such an array must be situated at a suitable height along the top region of the truck bed wall to avoid contact with an appreciable amount of asphalt when introduced therein as well as to allow for greater coverage of the truck bed interior (and movable cover) by the release agent spray when operated. Preferably, such an array is configured with a sufficient number of nozzles that allow for coverage of every surface of the subject truck bed interior. To that end, then, the rotating array will be disposed away from the truck bed interior wall adjacent to the cab a sufficient distance to permit proper movement of the array to spray the interior wall up to a point just below the level of the nozzle array itself. Furthermore, the nozzles should also be configured to dispense release agent fluid at a suitable velocity to reach the end wall portions of the truck bed (and thus can withstand air pressures of at least 100 psi, preferably up to about 150 psi, for such a purpose; in one potentially preferred embodiment, such air pressure is supplied through the same source that provides air to the truck brakes; external sources of air may be utilized for such a purpose, as well, and mounted onto a portion of either the chassis or the bed portion of the entire vehicle). As well, the number of nozzles within the array should be selected to reduce the potential for overlap in release agent applications to truck bed interior surfaces in combination with the extent of spray coverage for each individual nozzle. In other words, in order to best ensure an even application of release agent fluid (coating), the nozzles should be arranged within the array to reduce the chances of excess coating in certain areas, ostensibly to reduce the costs associated with such materials. However, all in all, the overall inventive device is particularly directed to a suitable nozzle array and method of use thereof that accomplishes the maximum release agent coverage of a truck bed interior on demand by the driver/operator through activation from within the chassis or cab.

As noted above, the overall device includes the capability to rotate the nozzle array to dispense release agent fluid not only onto the interior truck bed surfaces prior to asphalt introduction therein, but also the option to actually apply such a coating to the underside of a movable fabric (or other like material) cover. Such a cover is typically a roll-type device that stores the fabric (or other material cover) along a cylindrical post that adjusts through the movement of opposing perpendicular poles that are activated through a motor to rotate outside a truck bed from the adjacent cab wall region to the end wall. In such a situation, the cover will roll down over the truck bed when the opposing perpendicular poles move from cab region to end wall in order to prevent (or at least significantly reduce the propensity of) asphalt discharge from the truck bed during transport. When not in use (such as when the truck reaches its delivery location, for instance), the opposing perpendicular poles will move back to the cab region of the truck bed to remove the cover from over the subject truck bed (to, for instance, allow for asphalt dumping to a road construction location). The potential for asphalt to adhere and damage such a cover is quite high, unfortunately. The capability of the driver/operator then to apply release agent fluid to the cover prior to asphalt introduction through the rotating spray method described herein is unique, particularly since application of such a coating is rather difficult to achieve utilizing an external device (when the truck bed is covered and empty, a person utilizing an external spraying device would be effectively enclosed within the covered bed). The benefits, then, of the inventive device and method are quite noticeable in that the typical external device spray method would require the user to apply a coating that would cover him- or herself in addition to the entirety of the subject truck bed. This inventive device and method avoids that possibility and allows the driver/operator to spray the subject truck bed and movable cover on demand instead.

As such, this capability thus permits the driver/operator to apply the release agent fluid (coating) at any time prior to asphalt introduction, thus not only allowing for a clean application within the truck bed interior (and with little to no chance of any such coating escaping the truck bed), but also permitting such application in a manner that is timely for maximum release agent effect to occur. If a release agent is applied too early, for instance, prior to asphalt placement within the subject truck bed, the coating may not remain in place on certain vertical truck bed portions and/or may undesirably pool in other horizontal regions. Additionally, such a coating may lose effectiveness if environmental conditions are not optimal, particularly if the coating remains on the truck bed surfaces for an appreciable time period prior to asphalt contact. Thus, the ability to dispense such materials on demand alleviates these potential problems and allows for greater efficiency and reliability to the driver/operator (as well as the asphalt purchaser, for that matter).

With that in mind, such an inventive device is further configured with an activation switch/assembly that is readily available for the driver/operator, either within the cab/chassis or just outside such a location. This overall device will include an air pump, to provide sufficient pressure to dispense a fluid coating (which may, in a potentially preferred embodiment, as noted above, be the pressurized air source for the truck brakes), a fuel pump (to control the dispensing of the coating materials) and a container/reservoir in which the coating materials are kept prior to transfer to the nozzle array. A dispense line (fuel line) is also included to deliver the coating materials/air to the nozzle array and may be configured and disposed in any manner for proper transfer to be undertaken. Such a dispense line may be of metal, rubber, or plastic construction (preferably rubber and rated to withstand at least 200 psi) to withstand the pressures and resist corrosion and other potential problems. The line may be disposed along the exterior of the truck bed and connected to the nozzle array within the top region of the truck bed wall adjacent to the cab. Such a line is preferably aligned directly with one end of the nozzle array to feed the coating materials through the array for effective distribution. Alternatively, the line may be disposed at a point in the middle of the array to provide an effective even distribution of materials through the array as well. In either case, it is preferable that a proper opening be provided within either the cab-adjacent truck bed wall or one side wall of the truck bed to allow for the externally disposed line to be connected within the internally disposed nozzle array. The driver/operator then can operate the overall device through a switch/assembly, as noted above, such as through opening an air valve that sends pressurized air through a T-joint into the feed line above the fuel pump. Such an action would then draw pumped coating materials into the feed line and then on to the nozzle array. Such an operating action can also simultaneously activate the rotation of the nozzle array (through a connected motor) or the operator may separately operate a control switch to activate the rotating effect. In any event, the motor is present external to the truck bed (although it may be present within the truck bed, if desired) and swivels the nozzle array anywhere from 150 to 360°, thereby allowing for the coating materials to reach all regions and surfaces of the interior of the subject truck bed as well as coat the underside of an extended cover (as described above). The array may thus be attached to the cab-adjacent truck bed wall through a plurality of brackets that permit such rotation (e.g., the array may be cylindrical in shape to rotate in such a manner and the brackets include proper openings for such rotation). The array should also be disposed at a height above that of typical asphalt loads within the subject truck bed. This protects the array itself from being contacted with deleterious amounts of hot, adhesive asphalt and further permits for the necessary coverage of the spray nozzles for the entirety of the interior truck bed surfaces during operation. Such a configuration takes into account the problems that exist with the "doghouse" region of the truck bed with the capability of coating all surfaces within the subject truck bed, as well. Again, as discussed previously, the nozzle array is properly placed and disposed to allow for the release agent fluid (coating) to reach all such interior surfaces, particularly with the utilization of a sufficient amount of pressurized air.

The release agent fluid (also referred to as coating materials) may be of any suitable kind that provides effective asphalt release properties and results from a typical truck bed surface and that exhibits suitable viscosity and other characteristics that permits proper spray dispensing through a nozzle array to such truck bed interior surfaces. There are numerous examples of such release agents within the art, including vegetable, animal, and mineral oils, polysiloxanes, polysilanes, polysiloxane emulsions, anionic surfactants, cationic surfactants, nonionic surfactants, amphoteric surfactants, polyalkylene glycols, polycycloaliphatic amines, silicone-in-oil emulsions, terpenes, and any combinations, formulations, and mixtures thereof. In terms of commercial products that exhibit proper results for such a purpose, WD-40®, a product of WD-40 Company, as one example, may also be utilized. Basically, however, the inventive device and method may employ any known coating material (or materials in combination) that exhibit the proper coating, release, and spraying properties for such a purpose.

As alluded to above, the only other teachings and disclosures that pertain to release agents for such a purpose are presented in terms of spraying by a non-integrated method, not by a system that is operated by a driver/operator on demand and from a cab/chassis directly. Such a distinct benefit has been attained with this invention.

DETAILED DESCRIPTION OF THE DRAWINGS AND PREFERRED EMBODIMENTS OF THE INVENTION

Hereinafter, preferred embodiments of the present invention will now be described with reference to the accompanying drawing. Such descriptions are not intended to limit the scope of the overall invention but only to provide one potential embodiment thereof.

Figure 1:
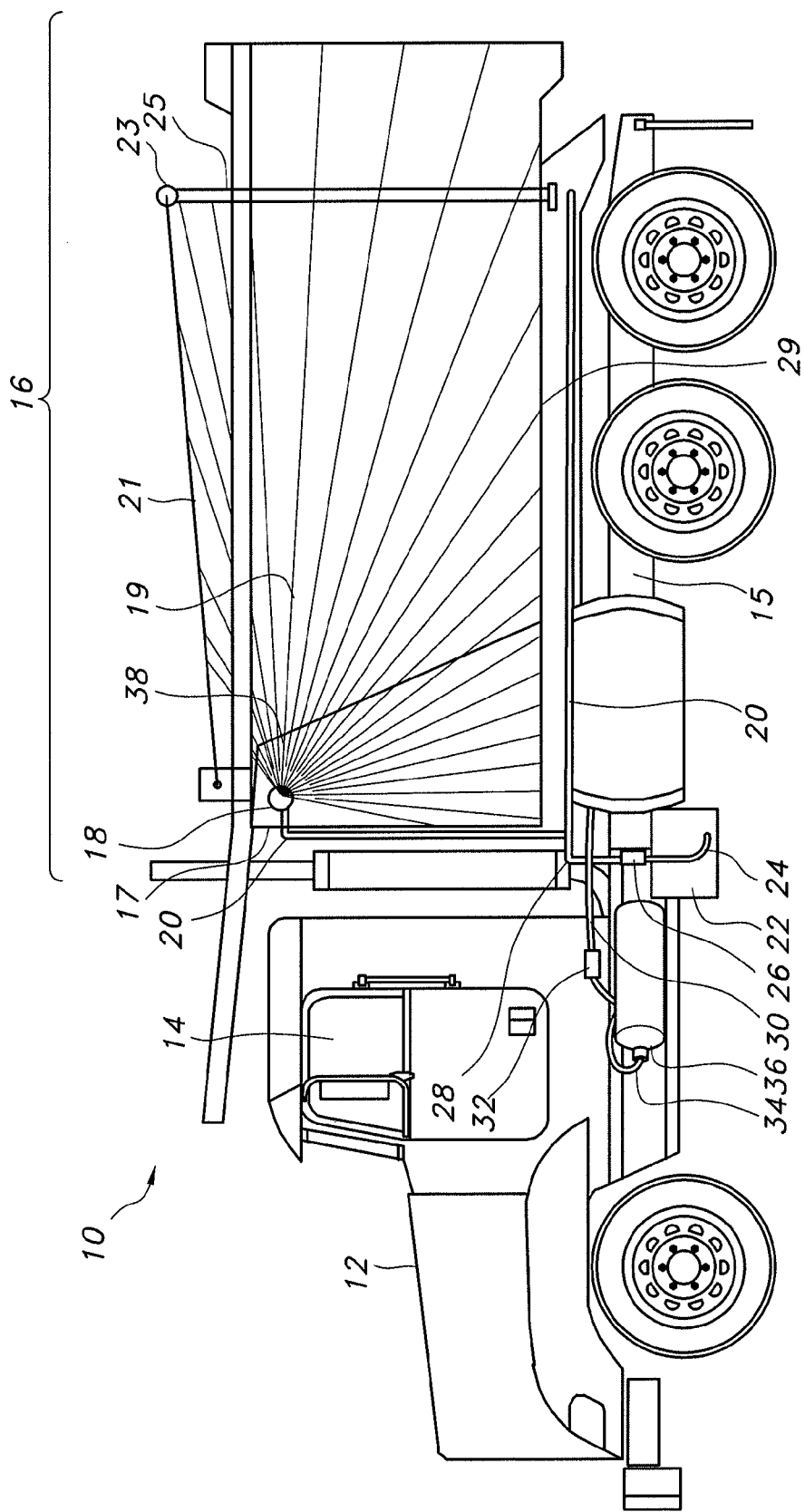
FIG. 1 depicts a cross-sectional side view of the integrated inventive device within a dump truck bed.

As shown in FIG. 1, a dump truck 10 including an engine 12, a cab 14, and a bed 16 that is utilized to carry and dump materials (such as asphalt, not illustrated) further includes a rotating nozzle array 18. Such an array 18 provides capability of delivering coating materials 19 over the entirety of the interior of the truck bed 16 during operation. The truck 10 further includes a movable cover 21 that winds around a pole 23 connected to opposing perpendicular movable poles 25. Such a cover 21 allows for complete coverage of the interior of the truck bed 16 when extended fully. The array 18 rotates sufficiently to coat the underside of the cover 21 when it is fully extended, as well. The truck bed 16 is bounded by two side walls (such as 112 in FIG. 2), a cab-adjacent wall 17, a bottom 29, and an end wall (not illustrated). The nozzle array 18 is mounted on the cab-adjacent wall 17 in such a manner as to extend within the interior of the truck bed 16 for the necessary rotation to occur on demand. The array 18 is further mounted above the "doghouse" 38 portion of the truck bed 16 (the "doghouse" is an indentation to permit exterior housing of the dumping activation machinery and other items not illustrated). The array 18 is connected to a feed line 20 (such as a rubber hose of at least 200 psi rating) that runs downward along the exterior of the cab-adjacent wall 17 and exterior of the truck bed bottom 29. The line 20 curves back along the truck frame 15 leading to a T-joint 28. One end of the T-joint 28 leads to an air line 30 to an air valve 32 and out through another line 34. This second line 34 is connected to an air tank 36 (kept at minimum 100 psi) to provide a pressure source for dispensing of coating materials 19 through the nozzle array 18 (such a tank also simultaneously and primarily supplies air to the truck brakes in this embodiment; alternatively, if desired, a separate air tank may be mounted on the chassis or truck bed to supply pressurized air for array). The T-joint 28 also leads to a pump 26 attached to a feed line 24 whose end resides in a coating source reservoir 22. This reservoir (container) thus houses the coating materials 19 that are utilized to coat the interior of the truck bed 16 and the underside of the movable cover 21. On demand, the driver/operator (not illustrated) sitting within the cab 14 may activate the air valve 32 which generates the necessary pressure to transfer the coating materials 19 from the reservoir 24 to the feed hose 20 to the nozzle array 18. An integrated motor (122 of FIGS. 2 and 3, for instance) works as well, then, to rotate the array 18 and distribute the coating materials 19 as desired within the interior of the truck bed 18 and/or on the underside of the movable cover 21.

Figure 2:
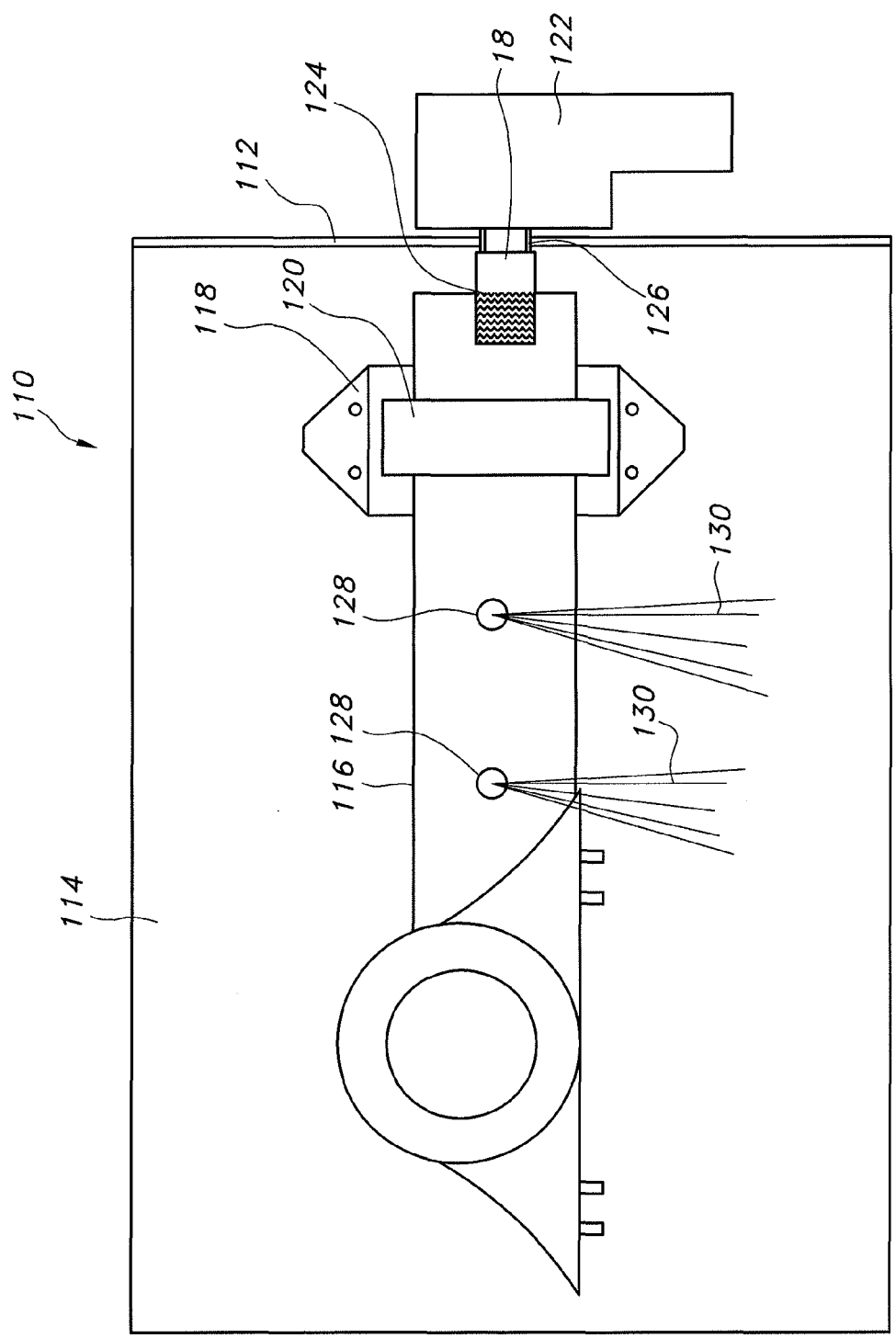
FIG. 2 depicts a front view of a portion of the rotating nozzle array of the inventive device.
Figure 3:
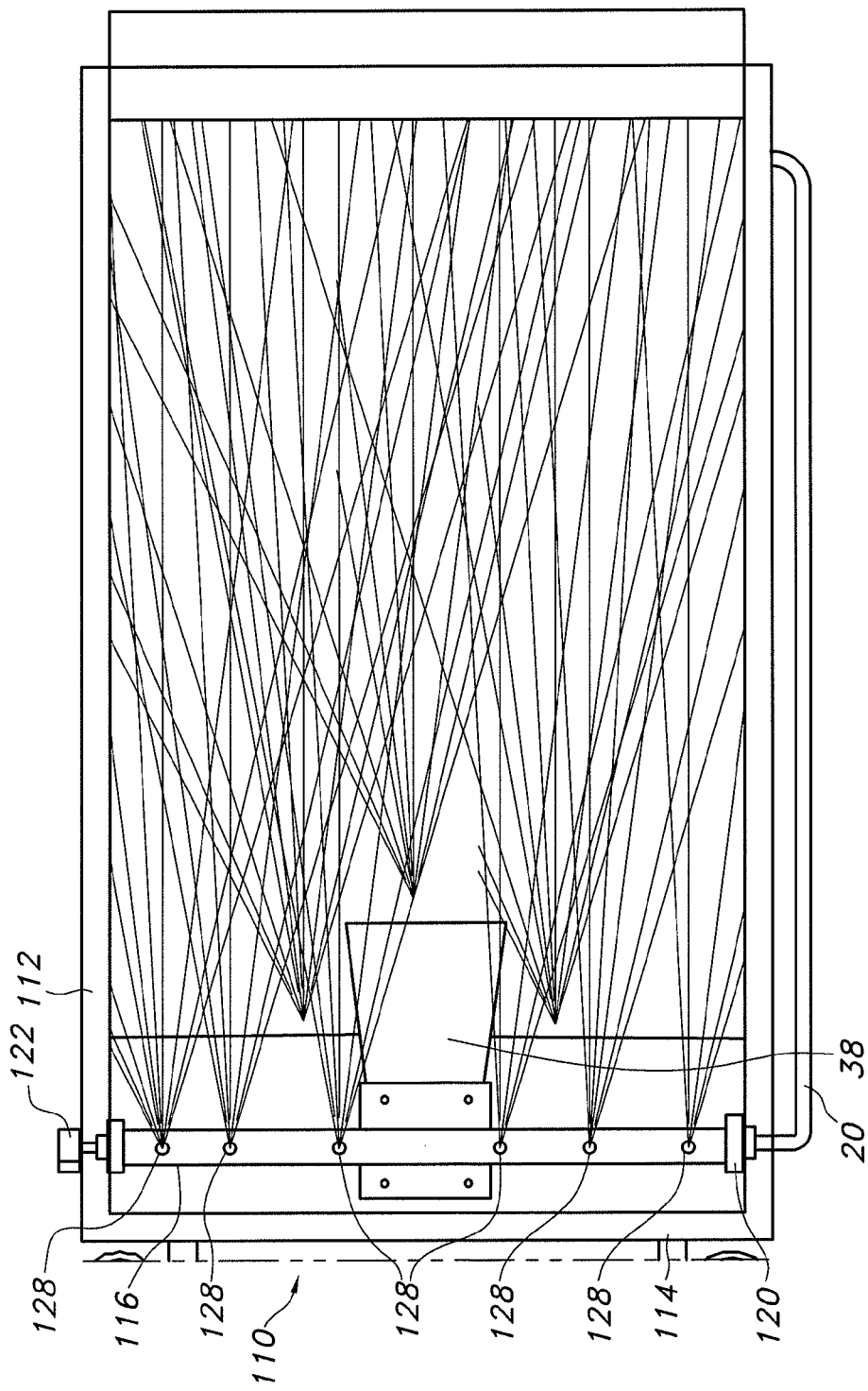
FIG. 3 is an elevated view of the inventive device spraying the interior of an integrated truck bed.

FIG. 2 shows a closer view of the integrated array 110. The cab-adjacent wall 114 includes a plurality of brackets 118 (others not illustrated) that include further open brackets 120 through which the cylindrical nozzle array 116 is introduced. The open brackets 120 allow for rotation of the nozzle array 116 when the electric motor 122 is in operation. The motor 122 is connected to the array 116 through an opening in the truck bed side wall 112 and a properly aligned gear connector 124. The nozzle openings 128 thus spray coating materials 130 upon activation of the air valve (32 of FIG. 1) or other switch/assembly by the driver/operator. Such nozzle openings 128 may be of any proper gauge to allow for the desired coverage of coating materials within the interior of the truck bed (16 of FIG. 1) and when the air pressure applied is at least 100 psi. Thus, a gauge of from 5 mm to 1.5 cm is preferred. FIG. 3 thus shows the elevated view of the coating process utilizing the overall integrated array 110.

Thus, with the implementation and utilization of such a device, a driver/operator may apply a desired level of coating materials to his or her truck bed (and movable cover, if desired) on demand. Such an operation may be accomplished up to the moment just prior to asphalt introduction therein to permit a timely application over as much of the truck bed interior, etc., as necessary to prevent unwanted asphalt accumulation. As well, this inventive device and method removes any need to utilize an external spray implement to coat the truck bed interior and, for all intents and purposes, provides a more reliable method of evenly coating such surfaces, particularly with reduced potential for external spraying and undesirable spraying of a user/operator, and permits the aforementioned underside coating of the movable cover. To date, there has not been any device or method that permits such an action without having a user/operator actually present within the truck bed interior during such a procedure.

Ultimately, this allows for greater efficiencies, coupled with any effective release agents fluids (coating materials), to allow for proper transfer of asphalt materials to a road construction site, particularly in terms of guaranteeing the amount of asphalt delivered is substantially the same as ordered (and paid for, presumably). The capability of achieving such desired results with a system that is controlled by a driver/operator from within his or her cab only increases the importance and unexpectedly good benefits of such an inventive system as well.

The preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

I claim:

1. A dump truck comprising a cab and a truck bed having a floor, two side walls, a wall adjacent said cab, and a shorter wall opposite said cab-adjacent wall;

wherein said truck further includes an integrated spray device therein disposed and mounted within said truck bed at a location on the cab-adjacent wall and aimed toward said bed such that the spray generated thereby will solely enter said truck bed, wherein said device is further configured to rotate sufficiently from its disposed and mounted location to provide treatment of said spray over the entirety of said subject truck bed while rotating and spraying simultaneously.

2. The truck of claim 1 further including a movable, extendible cover also integrated within the subject truck that provides a manner of preventing egress of asphalt materials from said truck bed during transport; wherein said integrated spray device is configured in a manner to permit spraying from its disposed and mounted location of the underside of said cover when fully extended to cover said truck bed.

3. The truck of claim 2 wherein said spray device utilizes an air tank for supplying pressurized air thereto, wherein said air tank simultaneously provides air for the brakes of said truck.

4. The truck of claim 1 wherein said spray device includes a substantially straight line array of nozzles disposed at a level within said truck bed sufficiently high to avoid contact with asphalt materials when introduced therein.

5. The truck of claim 4 wherein said spray device is activated through a switch present either within or just outside said cab.

6. The truck of claim 5 wherein said spray device utilizes an air tank for supplying pressurized air thereto, wherein said air tank simultaneously provides air for the brakes of said truck.

7. The truck of claim 4 wherein said spray device utilizes an air tank for supplying pressurized air thereto, wherein said air tank simultaneously provides air for the brakes of said truck.

8. The truck of claim 1 wherein said spray device utilizes an air tank for supplying pressurized air thereto, wherein said air tank simultaneously provides air for the brakes of said truck.

\* \* \* \* \*